(12) United States Patent
Kittmann et al.

(10) Patent No.: US 10,802,138 B2
(45) Date of Patent: Oct. 13, 2020

(54) SYSTEM AND METHOD FOR DETERMINING THE POSITION OF A TRANSMITTING UNIT AND WATERCRAFT HAVING A SYSTEM FOR DETERMINING THE POSITION OF A TRANSMITTING UNIT

(71) Applicant: Airbus Defence and Space GmbH, Taufkirchen (DE)

(72) Inventors: Klaus Kittmann, Kirchseeon (DE); Simon Burns, Munich (DE)

(73) Assignee: Airbus Defence and Space GmbH (DE)

( * ) Notice: Subject to any disclaimer, the term of this patent is extended or adjusted under 35 U.S.C. 154(b) by 264 days.

(21) Appl. No.: 16/046,068

(22) Filed: Jul. 26, 2018

(65) Prior Publication Data

US 2019/0041512 A1 Feb. 7, 2019

(30) Foreign Application Priority Data

Aug. 2, 2017 (DE) .......................... 10 2017 117 495

(51) Int. Cl.
| | |
|---|---|
| *G01S 13/91* | (2006.01) |
| *G01S 7/40* | (2006.01) |
| *G01S 13/74* | (2006.01) |
| *G01S 13/87* | (2006.01) |

(52) U.S. Cl.
CPC .............. *G01S 13/913* (2013.01); *G01S 7/40* (2013.01); *G01S 13/74* (2013.01); *G01S 13/876* (2013.01)

(58) Field of Classification Search
None
See application file for complete search history.

(56) References Cited

U.S. PATENT DOCUMENTS

| | | | | |
|---|---|---|---|---|
| 4,799,062 | A | * | 1/1989 | Sanderford, Jr. ...... G01S 5/0009 340/8.1 |
| 5,144,315 | A | * | 9/1992 | Schwab ................ G01S 5/0009 342/169 |
| 5,365,516 | A | * | 11/1994 | Jandrell ................ G01S 5/0009 340/991 |
| 6,114,975 | A | * | 9/2000 | Guillard ................ G01S 5/0063 340/945 |

(Continued)

FOREIGN PATENT DOCUMENTS

DE 602 22 606 T2 7/2008

*Primary Examiner* — Peter M Bythrow
(74) *Attorney, Agent, or Firm* — Lerner, David, Littenberg, Krumholz & Mentlik, LLP

(57) ABSTRACT

A system for determining the position of a transmitting unit has an arrangement of at least four transmitting units. A first transmitting unit is designed to emit a first transmission signal to each of the three remaining units, each of which is designed to receive the first transmission signal and, thereafter, to return a first response signal to the first unit. The three remaining units each have stored position data relating to desired positions of the arrangement. The first unit is designed to: determine its relative position data relative to the three remaining units based on the returned first response signals, obtain the stored position data relating to the desired positions from the three remaining units, and assign the determined relative position data to the obtained position data relating to a single desired position to determine the position of the first unit within the arrangement based on the assignment.

15 Claims, 2 Drawing Sheets

(56) References Cited

U.S. PATENT DOCUMENTS

| | | | |
|---|---|---|---|
| 6,469,654 B1* | 10/2002 | Winner | G01S 3/46 342/33 |
| 6,876,326 B2* | 4/2005 | Martorana | G01S 1/022 342/458 |
| 7,411,551 B2* | 8/2008 | Choi | G01S 13/878 342/378 |
| 8,531,290 B2* | 9/2013 | Ghisani | A45C 13/18 340/539.13 |
| 9,423,489 B2* | 8/2016 | Oehler | G01S 5/0284 |
| 9,606,219 B2* | 3/2017 | Murdock | G01S 5/14 |
| 2001/0053699 A1* | 12/2001 | McCrady | G01S 5/0221 455/513 |
| 2002/0155845 A1* | 10/2002 | Martorana | G01S 5/14 455/456.1 |
| 2003/0142587 A1* | 7/2003 | Zeitzew | G01S 15/74 367/127 |
| 2004/0022214 A1 | 2/2004 | Goren et al. | |
| 2004/0220722 A1* | 11/2004 | Taylor | G01S 5/08 701/400 |
| 2005/0046608 A1* | 3/2005 | Schantz | H04B 5/0075 342/127 |
| 2006/0071780 A1* | 4/2006 | McFarland | G01S 5/0289 340/539.2 |
| 2007/0217379 A1* | 9/2007 | Fujiwara | G01S 5/0289 370/338 |
| 2007/0257831 A1 | 11/2007 | Mathews et al. | |
| 2008/0231498 A1 | 9/2008 | Menzer et al. | |
| 2009/0143018 A1 | 6/2009 | Anderson et al. | |
| 2011/0081918 A1 | 4/2011 | Burdo et al. | |
| 2011/0221635 A1* | 9/2011 | Wang | G01S 5/0242 342/463 |
| 2012/0326923 A1* | 12/2012 | Oehler | G01S 5/0284 342/357.29 |
| 2013/0306800 A1* | 11/2013 | Meissner | G01S 5/021 244/189 |
| 2014/0073351 A1 | 3/2014 | Loetter | |
| 2014/0247184 A1* | 9/2014 | Wendel | G01S 5/0284 342/357.48 |
| 2016/0363659 A1* | 12/2016 | Mindell | G01S 5/0294 |
| 2017/0168134 A1* | 6/2017 | Jenwatanavet | G01S 5/0273 |
| 2017/0280288 A1 | 9/2017 | Do et al. | |
| 2017/0328683 A1* | 11/2017 | Smith | F41G 7/346 |
| 2018/0203466 A1* | 7/2018 | Chiodini | G01S 11/10 |

* cited by examiner

SYSTEM AND METHOD FOR DETERMINING THE POSITION OF A TRANSMITTING UNIT AND WATERCRAFT HAVING A SYSTEM FOR DETERMINING THE POSITION OF A TRANSMITTING UNIT

FIELD OF THE INVENTION

The present invention relates to the positioning of transmitting and receiving units for radio waves. In particular, the invention relates to a system for determining the position of a transmitting unit. The invention also relates to a watercraft having a system for determining the position of a transmitting unit and to a method for determining the position of a transmitting unit.

BACKGROUND OF THE INVENTION

If a local navigation system suffers a failure of an individual radio transmitter or a radio beacon within a multiplicity of radio transmitters, the system is indeed usually still operational, but with a certain deterioration in performance. In order to restore the full redundancy and performance, it is often necessary to replace the defective radio beacon. For this purpose, the replacement radio beacon can be programmed by inputting the physical location, that is to say the position, and the identification of that radio beacon which it is replacing. This is generally carried out manually by the service personnel as part of maintenance and repair work, which may be prolonged, on the one hand, and results in high maintenance costs, on the other hand. During the replacement and the reprogramming of the radio beacon by the service personnel, the radio beacon is not operational, which can also impair, in particular, the reliability of the navigation system. In addition, the maintenance work must often be carried out by the personnel under adverse operating conditions, in particular in poor weather conditions.

BRIEF SUMMARY OF THE INVENTION

An aspect of the present invention may improve the determination of the position of a transmitting unit in an arrangement of a plurality of transmitting units.

One aspect of the invention specifies a system for determining the position of a transmitting unit. The system has an arrangement of at least four transmitting units, wherein the arrangement forms an installation environment of the transmitting units, for example. The first transmitting unit of the at least four transmitting units is designed to emit a first transmission signal to each of the three remaining transmitting units. Each of the three remaining transmitting units is designed to receive the first transmission signal and, after receiving the first transmission signal, to return a first response signal to the first transmitting unit. The transmitting units can therefore also be designed to receive a signal. Consequently, the transmitting units can also be transmitting and receiving units or can be referred to as such. The first transmitting unit is designed to determine relative position data relating to the first transmitting unit with respect to the three remaining transmitting units on the basis of the returned first response signals. The three remaining transmitting units each have stored position data relating to desired positions of the transmitting units within the arrangement of transmitting units. The first transmitting unit is designed to obtain the stored position data relating to the desired positions from the three remaining transmitting units. The first transmitting unit is designed to assign the relative position data determined by the first transmitting unit to the obtained position data relating to a single desired position, for example on the basis of a table value, in order to determine the position and/or identity of the first transmitting unit within the arrangement of transmitting units on the basis of the assignment.

Such determination of the position of the first transmitting unit, in particular the unique assignment to the desired position, makes it possible to determine the exact position of the first transmitting unit. This may be necessary, for example, when replacing transmitting units for radio beacon systems. Since the position of the first transmitting unit within an arrangement of transmitting units can therefore be exactly determined, further manual programming steps by the maintenance personnel are not required. For example, the required assignment values can be obtained, that is to say downloaded, from other transmitting units already present in the system. The system according to an embodiment of the invention for determining the position of the transmitting unit therefore considerably reduces the maintenance effort for such a transmitting unit, in particular in the case of adverse environmental conditions or adverse weather conditions.

The system for determining the position can therefore prove to be particularly advantageous in watercraft or ships on which a radio beacon is used as a landing aid for aircraft. Transmitting and receiving units for radio waves are therefore positioned using the system according to an embodiment of the invention. The transmitting units may therefore be transmitters and receivers for radio beacons or beacon lights. In particular, the transmitting units may be radio transmitters and radio receivers.

The at least four transmitting units can be positioned in a particular spatial arrangement with respect to one another. In this case, the transmitting units can be arranged at respectively predefined distances relative to one another. The transmitting units may be arranged, for example, in a particular pattern, for example a rectangle or a square. More than four transmitting units can also be provided in the arrangement. The transmitting units are designed, for example, to emit signals, that is to say transmission signals, but also to receive emitted signals, for example response signals. In other words, the transmitting units can emit transmission signals and can receive response signals, that is to say reception signals.

The first transmitting unit therefore transmits a first transmission signal to the remaining at least three transmitting units, whereupon these at least three or more transmitting units each receive the first transmission signal. After receiving the first transmission signal, the at least three transmitting units each generate a first response signal in response to the reception of the first transmission signal and return this first response signal to the first transmitting unit. The first transmitting unit can now determine the relative position data relating to the first transmission signals on the basis of the transmitted transmission signal and the returned first response signals, in which case the relative position data have information relating to a relative position of the first transmitting unit with respect to each of the remaining three transmitting units. That is to say, a propagation time measurement of the first transmission signal and/or of the respective response signal, for example, can be used to calculate the distance between the first transmitting unit and each of the three remaining transmitting units, ultimately resulting in the relative position of the first transmitting unit within the overall arrangement. A distance between the transmitting units can therefore be calculated from the propagation time measurements taking into account the known propagation speeds of the signals.

The three remaining transmitting units also have stored position data relating to desired positions of the arrangement of transmitting units. This means that information relating to the desired positions of each individual transmitting unit in the arrangement of at least four transmitting units is stored in the remaining three transmitting units. In this case, the desired positions mark, for example, those desired positions of the transmitting units at which a completely adjusted, tuned and operational navigation system can be provided. If the transmitting units were exactly at the desired positions, a further determination of the position or calibration would therefore no longer be required. The information relating to the desired positions of the transmitting units can be obtained or downloaded from the three other transmitting units by the first transmitting unit which has been subsequently inserted into the arrangement of transmitting units, for example. In other words, the first transmitting unit can obtain the stored position data relating to the desired positions of the transmitting units from the three remaining transmitting units as part of a download procedure. This makes it possible to provide a type of learning process in which the first transmitting unit learns the position data relating to the desired positions from the three remaining transmitting units.

There is therefore no longer any need to preprogram or preconfigure or manually program the desired position data in the first transmitting unit since these data can be provided via the functioning transmitting units which are already in the arrangement. This is useful, in particular, when replacing an individual transmitting unit since the maintenance personnel no longer has to carry out any programming steps in order to determine the position of the first transmitting unit, that is to say the replaced transmitting unit. This makes it possible to provide a fast and repeatable process when replacing the first transmitting unit, in particular a radio beacon transmitting unit.

The relative position data relating to the first transmitting unit with respect to the three remaining transmitting units, as determined by means of the response signals, are then assigned to a position value, that is to say a stored desired position. The assignment may involve, for example, assigning the determined relative position data to a suitable table value for a desired position. In this case, provision may be made for the determined relative position data to be assigned to that position value or that desired position which is closest to the determined relative position data. In other words, the assignment may comprise a type of exclusion method in which those desired positions or table values for desired positions whose correspondence to the determined relative position data is virtually excluded are rejected since there is scarcely any correspondence of the determined relative position data to the table values, for example. If, in contrast, there is an approximate correspondence between the determined relative position data and individual table values, the determined relative position data can be assigned to the table value, that is to say to a single desired position stored as a table value, and the position of the first transmitting unit can therefore be uniquely assigned to the desired position. The position of the first transmitting unit within the arrangement of transmitting units is therefore exactly determined, with the result that the first transmitting unit can be incorporated into the arrangement of the three remaining transmitting units. The first transmitting unit is therefore uniquely identified within the arrangement of transmitting units.

After the position or the identity of the first transmitting unit has been exactly determined, all transmitting units in the arrangement of the at least four transmitting units are now tuned or balanced to one another in terms of signaling. This means that, with the knowledge of the exact positions and/or identities of the at least four transmitting units, an exact position and/or orientation of a moving object, for example an aircraft, in the environment of the arrangement of transmitting units can be determined. In particular, the relative position and/or orientation of the object can be determined on the basis of propagation time measurements between each individual transmitting unit in the arrangement of the now tuned transmitting units and the moving object since the position of the individual transmitting units with respect to one another is known.

According to one embodiment of the invention, the first transmitting unit is designed to capture a discrepancy between the determined relative position data relating to the first transmitting unit and the assigned desired position and to calibrate a transmission parameter of the first transmitting unit on the basis of the captured discrepancy.

The discrepancy between the determined relative position data relating to the first transmitting unit and the position data relating to the assigned desired position is determined, for example, in the form of a geometric distance between the determined, that is to say current, position of the first transmitting unit within the arrangement of transmitting units and the desired position of the first transmitting unit.

The current position of the first transmitting unit within the arrangement of transmitting units is determined, for example, by means of a propagation time measurement of the first transmission signal and the first response signals. The desired position is, for example, a stored value which indicates a desired position of the first transmitting unit within the arrangement. The difference between the determined position and the desired position therefore results in the above-mentioned discrepancy.

A very small discrepancy between the determined position and the individual desired positions can be determined by comparing the determined position with a multiplicity of desired positions, for example in the form of a table search. The desired position belonging to this very small discrepancy can now be allocated to the first transmitting unit, with the result that the exact position and identity of the first transmitting unit within the arrangement can be uniquely determined. This position can in turn be stored in the first transmitting unit and/or the three remaining transmitting units, with the result that the position and the identity of each transmitting unit within the arrangement of transmitting units are known. This makes it possible to achieve a type of initialization of the arrangement of transmitting units, with the result that the relative position and/or orientation between the arrangement of transmitting units and a moving object can then be determined by means of this initialized and tuned arrangement.

According to one embodiment of the invention, the calibration of the first transmitting unit comprises setting a time parameter and/or a frequency parameter of the first transmitting unit. The calibration can also comprise the setting of a time value and/or a frequency value.

This means that a time value or times for the emission of a transmission signal by the first transmitting unit is/are set. Additionally or alternatively, a frequency of the first transmission signal emitted by the first transmitting unit can be set. For example, the time parameter or the time value and/or the frequency parameter or the frequency value is/are stipulated. The time parameter and/or the frequency parameter can be set and stipulated by the first transmitting unit itself.

All transmitting units can be equipped with a control unit which can carry out the emission and reception as well as the assignment and the calibration. The control unit in the first transmitting unit can be designed to obtain the stored position data relating to the desired positions from the three remaining transmitting units and to also assign the relative position data determined by the first transmitting unit to the obtained position data relating to a single desired position. The control unit may be a data processing system or a processor.

The calibration takes into account, for example, geometric discrepancies which change the signal transmission characteristics. These may be, inter alia, discrepancies which are caused by temperature differences and can influence the transmission behavior of the transmission and response signals. For example, the result may be a temperature-related delay of the individual transmitting units which can be compensated for by means of the calibration.

According to one embodiment of the invention, the transmission signal and/or the first response signals is/are radio-frequency-based signals.

The transmission signal and/or the response signals is/are, for example, radio waves which are used as measurement signals, in particular are used to measure the propagation time of the transmission and response signals between the individual transmitting units.

According to one embodiment of the invention, the response signals have the position data relating to the desired positions of the arrangement of transmitting units.

The position data relating to the desired positions can therefore be modulated using the response signal. That means that the first response signal which is emitted by each of the three remaining transmitting units to the first transmitting unit has the position data relating to the desired positions. These data can therefore be modulated using the actual radio-frequency-based measurement signal. It is therefore possible to simultaneously forward the position data relating to the desired positions with the first response signal used for the propagation time measurement to the first transmitting unit, that is to say the newly installed or replacement transmitting unit.

According to one embodiment of the invention, the first response signals have data relating to a geometric boundary condition for an arrangement of the individual transmitting units within the arrangement of transmitting units. The boundary condition may be a mathematical boundary condition. The geometric boundary condition may be understood as meaning, for example, a specification or limitation of possible positions of the first transmitting units and also of the remaining transmitting units within the arrangement of transmitting units. The boundary condition can be stored as information in each of the three remaining transmitting units.

According to one embodiment of the invention, the first transmitting unit is designed to assign the relative position data determined by the first transmitting unit to the obtained position data relating to a single desired position using the data relating to the geometric boundary condition in order to determine the position and/or identity of the first transmitting unit within the arrangement of transmitting units on the basis of the assignment.

For example, the boundary condition may be specified by geometric position boundary values which allow the determined relative position of the first transmitting unit to be assigned to the desired position on the basis of fewer than three response signals. This is because the boundary condition already excludes some of the possible desired positions of the first transmitting unit. Fewer desired positions to which the first transmitting unit can be assigned therefore remain for selection.

According to one embodiment of the invention, the geometric boundary condition specifies the arrangement of the at least four transmitting units in a plane.

The geometric boundary condition may be, for example, a condition that the at least four transmitting units are in one plane. There is therefore no need to compare all possible desired positions with the determined relative position of the first transmitting unit. In particular, the various possibilities which can be used to assign the first transmitting unit to a desired position can be limited. This is because the first transmitting unit is intended to be assigned only to a single desired position which is ultimately intended to reflect its exact position and/or identity within the arrangement of transmitting units so that a functioning, that is to say adjusted, arrangement of transmitting units can be provided. This adjusted arrangement can then be used as a navigation aid for objects moving with respect to the arrangement.

According to one embodiment of the invention, each transmitting unit in the arrangement of at least four transmitting units is designed to receive a radar signal from an object moving relative to the arrangement and to consequently emit a response signal to the moving object, with the result that a relative position of the moving object with respect to the arrangement of at least four transmitting units can be determined.

It is therefore possible to provide a navigation aid for navigating the moving object with respect to the arrangement of transmitting units. The moving object is, for example, an aircraft, in particular a helicopter or an airplane. The arrangement of transmitting units is arranged, for example, in the region of a landing site for the aircraft, with the result that navigation information for the aircraft can be provided on the basis of the response signal to the aircraft emitted by the transmitting units in the arrangement. This navigation information may comprise a relative position and/or orientation of the aircraft with respect to the arrangement of transmitting units.

According to one embodiment of the invention, the arrangement has a total of eight transmitting units, at least six, preferably exactly six, transmitting units of which are arranged substantially in one plane. All previously mentioned properties of the arrangement of four transmitting units can therefore also apply to eight transmitting units, in which case the position of a first transmitting unit is always newly determined by means of the system according to an embodiment of the invention. This may become necessary when replacing a transmitting unit as part of maintenance work in which a new transmitting unit, here the first transmitting unit, is installed in the arrangement and must now be positioned so that an adapted or adjusted arrangement of transmitting units can be provided for the navigation aid. The plane may form a landing area for an aircraft, in particular for a helicopter.

According to one embodiment of the invention, two transmitting units of the total of eight transmitting units are arranged at a distance from the plane.

This means that the two transmitting units arranged at a distance are not in the plane. The transmitting units arranged at a distance are, for example, on a connecting line which runs parallel to the plane.

One aspect of the invention specifies a watercraft having the above-described system according to an embodiment of the invention for determining the position of a transmitting unit.

The watercraft is, for example, a ship, in particular a military ship. The watercraft may have a heliport which is marked or enclosed by the transmitting units in the arrangement of transmitting units.

According to one embodiment of the invention, the arrangement of at least four, preferably six, transmitting units bounds a landing area for an aircraft.

A radio beacon can therefore be provided in the immediate vicinity of the landing area for the aircraft, with the result that the aircraft can be safely navigated relative to the watercraft even in the case of adverse environmental conditions.

One aspect of the invention specifies a platform having the above-described system according to an embodiment of the invention. The platform may be a stationary platform or a moving platform. The platform can therefore be, for example, a transport vehicle, an oil drilling platform, a helipad etc.

The platform may also be an aircraft. For example, the platform is incorporated into a manned or unmanned aircraft, with the result that the moving object, which may likewise be a manned or unmanned aircraft, can be navigated with respect to the aircraft having the platform. In particular, the platform having the system according to an embodiment of the invention may be an airplane, with respect to which navigation of manned or unmanned airplanes is necessary so that these escort planes can be accurately positioned or oriented with respect to the first-mentioned airplane. In order to be able to carry out this accurate positioning or orientation, the system according to an embodiment of the invention can previously determine the exact position and identity for all transmitting units in the system if it was necessary to replace a transmitting unit.

The platform may also be a land vehicle. For example, the platform is a military land vehicle. It is therefore possible to navigate objects moving with respect to the land vehicle. For example, it is possible to navigate manned or unmanned aircraft with respect to the land vehicle.

One aspect of the invention specifies a method for determining the position of a transmitting unit. In one step of the method, at least four transmitting units are arranged in an installation environment. In a further step, a first transmission signal is emitted to each of the three remaining transmitting units. In a further step, the emitted first transmission signal is received by means of each of the three remaining transmitting units and a first response signal is returned to the first transmitting unit by means of each of the three remaining transmitting units. In a further step, relative position data relating to the first transmitting unit with respect to the three remaining transmitting units are determined on the basis of the returned first response signals. In a further step, position data relating to desired positions of the arrangement of transmitting units are stored by means of the three remaining transmitting units. In a further step, the stored position data relating to the desired positions are obtained from the three remaining transmitting units. In a further step, the relative position data determined by the first transmitting unit are assigned to the obtained position data relating to a single desired position in order to determine the position of the first transmitting unit within the arrangement of transmitting units on the basis of the assignment. The individual steps of the method can be carried out in any desired order or in the order stated above.

The system according to an embodiment of the invention proves to be particularly advantageous if a local navigation system suffers a failure of an individual radio transmitter or a radio beacon within a multiplicity of radio transmitters. In this case, it is only necessary to physically replace the failed radio transmitter with another, new radio transmitter. The setting of the position information and the identification of the new radio transmitter can then be carried out on their own accord, that is to say automatically, and no longer need to be input by the maintenance personnel. This also makes it possible to keep a smaller stock of replacement radio transmitters. In particular, a replacement part need not be stocked for each individual transmitting unit or each individual radio beacon.

In other words, the new beacon light or the new radio transmitter learns the stored data relating to its predecessor, that is to say the predecessor information, such as position information and identity of the predecessor beacon light, from the other radio transmitters. Since the data for the complete constellation, that is to say the predecessor information as well, can be stored in each beacon light, these data can be obtained from all other beacon lights in the arrangement of beacon lights by the new beacon light. If a plurality of beacon lights are replaced between performance cycles, the system can detect this and can emit a NOGO signal, with the result that an indication of the limited operational capability of the system can be communicated in this period.

DETAILED DESCRIPTION

The illustrations in the figures are schematic and are not true to scale.

If the same reference signs are used in various figures in the following description of the figures, these reference signs denote identical or similar elements. However, identical or similar elements can also be denoted by different reference signs.

Figure 1:
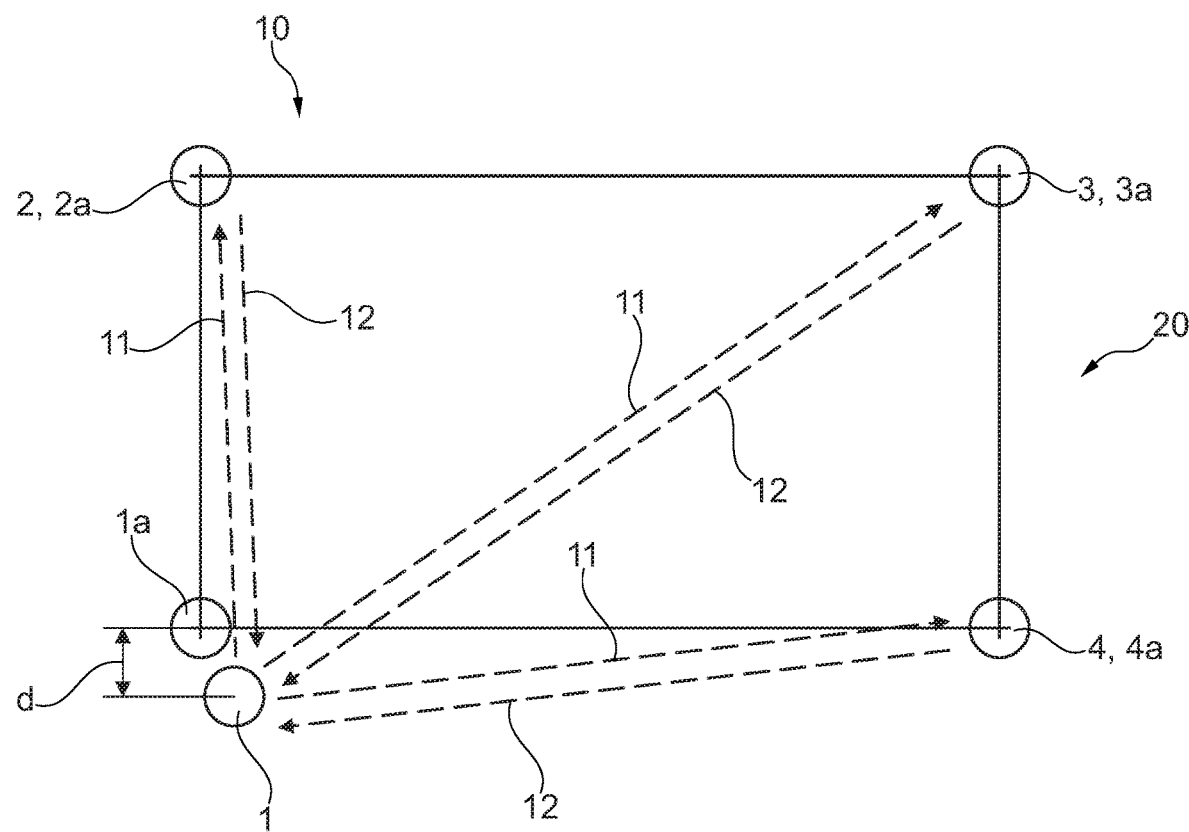
FIG. 1 shows an arrangement of at least four transmitting units according to one exemplary embodiment of the invention.

FIG. 1 shows a system 10 for determining the position of a first transmitting unit 1 within an arrangement 20 of transmitting units 1, 2, 3, 4. The arrangement may be arranged on a stationary or moving platform which is not illustrated in FIG. 1. A first transmitting unit 1 of the at least four transmitting units 1, 2, 3, 4 is designed to emit a first transmission signal 11 to each of the three remaining transmitting units 2, 3, 4. Each of the three remaining transmitting units 2, 3, 4 is designed to receive the first transmission signal 11 and, after receiving the first transmission signal 11, to return a first response signal 12 to the first transmitting unit 1.

The first transmitting unit 1 is designed to determine relative position data relating to the first transmitting unit 1 with respect to the three remaining transmitting units 2, 3, 4 on the basis of the returned first response signals 12. The relative position data are determined from a propagation time measurement of the first transmission signal 11 from the first transmitting unit 1 to the respective remaining transmitting units 2, 3, 4 and from a propagation time measurement of the first response signals 12 from the remaining transmitting units 2, 3, 4 to the first transmitting unit 1. For example, the propagation time of the first transmission signal 11 from the first transmitting unit 1 to the second transmitting unit 2 and the propagation time of the response signal 12 from the second transmitting unit 2 back to the first transmitting unit 1 are measured and added. A distance between the first transmitting unit 1 and the second transmitting unit 2 can therefore be calculated from the propagation time measurements taking into account the known propagation speeds of the signals.

The three remaining transmitting units 2, 3, 4 each have stored position data relating to desired positions 1a, 2a, 3a, 4a of the arrangement 20 of transmitting units 1, 2, 3, 4. The desired positions 1a, 2a, 3a, 4a are all illustrated in FIG. 1. The first transmitting unit 1 is designed to obtain the stored position data relating to the desired positions 1a, 2a, 3a, 4a from the three remaining transmitting units 2, 3, 4, for example from position data which are modulated using the signals, in particular response signals 12. A discrepancy d, in particular a geometrical distance d, between all obtained desired positions 1a, 2a, 3a, 4a and the determined relative position of the first transmitting unit 1 can be determined.

The first transmitting unit 1 is designed to assign the relative position data determined by the first transmitting unit 1 to the obtained position data relating to a single desired position 1a taking into account the discrepancy d. For example, that desired position 1a which has the smallest discrepancy d with respect to the determined relative position is assigned to the first transmitting unit 1. This is the desired position 1a in FIG. 1. Consequently, the position and/or identity of the first transmitting unit 1 within the arrangement 20 of transmitting units 1, 2, 3, 4 can be determined on the basis of the assignment, with the result that an adjusted and operational arrangement 20 of transmitting units 1, 2, 3, 4 is obtained, in which all transmitting units 1, 2, 3, 4 are tuned to one another and can now be used as navigation means for navigating moving objects with respect to the arrangement 20. During the assignment, it is possible to specify as a boundary condition that all transmitting units 1, 2, 3, 4 are intended to lie in one plane, with the result that the assignment is already possible on the basis of two first response signals 12 since the specification, for example, that the three transmitting units 1, 2, 3 lie in one plane and a respective distance measurement between the transmitting units 1 and 2 and the transmitting units 1 and 3 already suffice to determine the relative position of the transmitting unit 1 in space or in the arrangement 20. It is therefore possible to considerably restrict the number of possibilities with respect to the desired positions to which the first transmitting unit 1 can be actually assigned.

Figure 2:
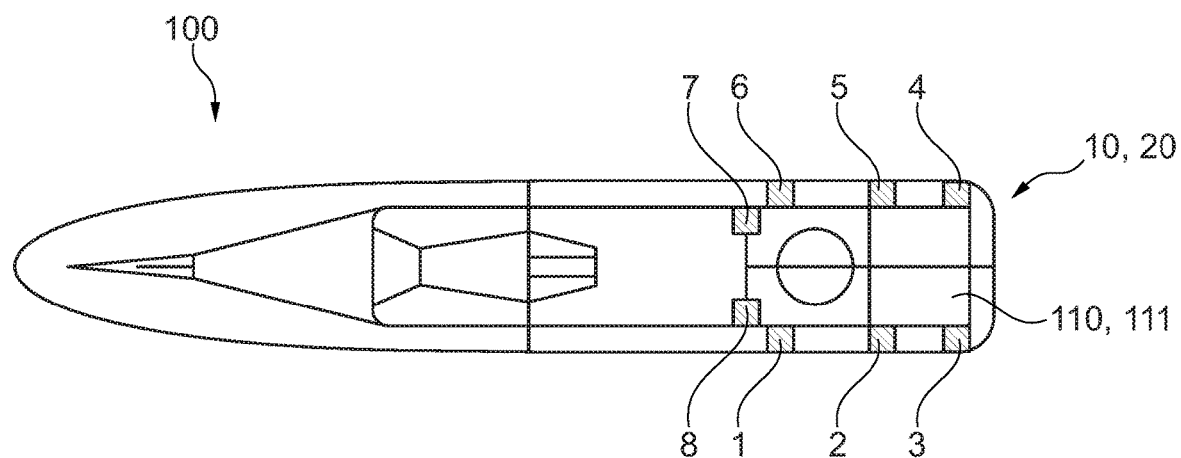
FIG. 2 shows a plan view of a watercraft having an arrangement of eight transmitting units according to one exemplary embodiment of the invention.

FIG. 2 shows a watercraft 100 having a system 10 for determining the position of a transmitting unit 1. The watercraft 100 may be a ship, in particular an aircraft carrier. For this purpose, the watercraft 100 may have a landing surface or a landing area 111 for the aircraft which is not illustrated in FIG. 2. The system 10 has an arrangement 20 of eight transmitting units 1, 2, 3, 4, 5, 6, 7, 8, six transmitting units 1, 2, 3, 4, 5, 6 of which are arranged in a plane 110, wherein the plane 110 forms the landing surface and the six transmitting units 1, 2, 3, 4, 5, 6 in the plane 110 delimit the landing area 111 for the aircraft.

Figure 3:
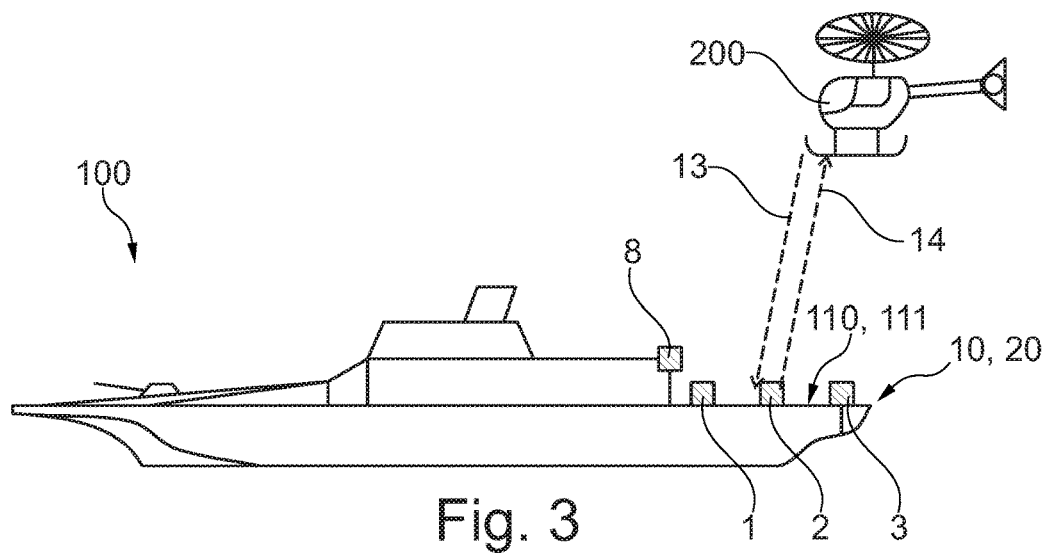
FIG. 3 shows a side view of a watercraft having an arrangement of eight transmitting units according to one exemplary embodiment of the invention.

FIG. 3 shows a side view of the watercraft 100 from FIG. 2. It can be clearly seen in FIG. 3 that the transmitting units 7 and 8 are not arranged in the plane 110, but rather are at a distance from the latter. In contrast, the six transmitting units 1, 2, 3, 4, 5, 6 are in the plane 110. If the system 10 or the arrangement 20 is operational, that is to say the transmitting units 1, 2, 3, 4, 5, 6, 7, 8 have all been adjusted, positioned, identified and calibrated, all transmitting units 1, 2, 3, 4, 5, 6, 7, 8 can be used as navigation means for navigating the aircraft 200 by virtue of transmission signals 13 being emitted to the transmitting units 1, 2, 3, 4, 5, 6, 7, 8 by the aircraft, the transmitting units 1, 2, 3, 4, 5, 6, 7, 8, after receiving the transmission signals 13, each returning a response signal 14 to the aircraft 200 and a relative position and/or orientation of the aircraft 200 with respect to the watercraft 100 and therefore the arrangement 20 then being determined on the basis of a propagation time measurement of the transmission signals 13 and the response signals 14. It is therefore possible to ensure safe landing of the aircraft 200 on the watercraft 100. In this case, the arrangement 20 of the transmitting units 1, 2, 3, 4, 5, 6, 7, 8 may have any desired form. FIGS. 2 and 3 show only one example of such an arrangement 20.

Figure 4:
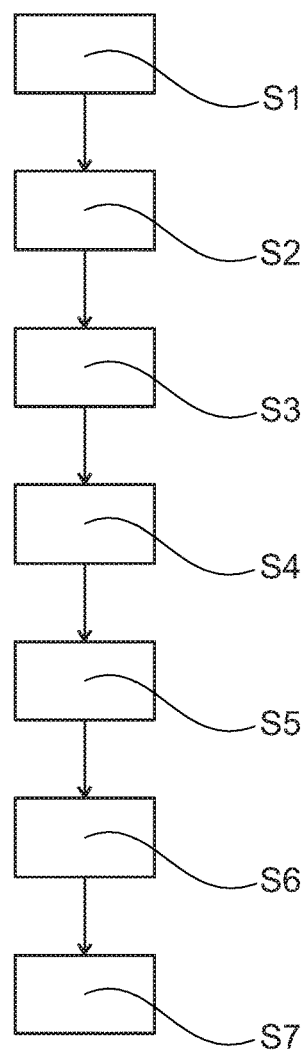
FIG. 4 shows a flowchart of a method for determining the position of a transmitting unit according to one exemplary embodiment of the invention.

FIG. 4 shows a flowchart of a method for determining the position of a transmitting unit 1. In a step S1, at least four transmitting units 1, 2, 3, 4 are arranged in an installation environment. The installation environment may either be stationary or may be arranged on a moving platform. In a further step S2, a first transmission signal 11 is emitted to each of the three remaining transmitting units 2, 3, 4. In a further step S3, the emitted first transmission signal 11 is received by each of the three remaining transmitting units 2, 3, 4 and a first response signal 12 is returned to the first transmitting unit 1 by each of the three remaining transmitting units 2, 3, 4. In a further step S4, relative position data relating to the first transmitting unit 1 with respect to the three remaining transmitting units 2, 3, 4 are determined on the basis of the returned first response signals 12. In a further step S5, position data relating to individual predefined desired positions 1a, 2a, 3a, 4a of the arrangement 20 of transmitting units 1, 2, 3, 4 are stored by the three remaining transmitting units 2, 3, 4. In a further step S6, the stored position data relating to the desired positions 1a, 2a, 3a, 4a are obtained from the three remaining transmitting units 2, 3, 4 by the first transmitting unit 1. Furthermore, in a further step S7, the relative position data determined by the first transmitting unit 1 are assigned to the obtained position data relating to a single desired position 1a in order to determine the position of the first transmitting unit 1 within the arrangement 20 of transmitting units 1, 2, 3, 4 on the basis of the assignment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for determining the position of a transmitting unit, the system comprising:
   an arrangement of at least four transmitting units;
   wherein a first transmitting unit of the at least four transmitting units is configured to emit a first transmission signal to each of the three remaining transmitting units;
   wherein each of the three remaining transmitting units is configured to receive the first transmission signal and, after receiving the first transmission signal, to return a first response signal to the first transmitting unit;
   wherein the first transmitting unit is configured to determine relative position data relating to the first transmitting unit with respect to the three remaining transmitting units on the basis of the returned first response signals;
   wherein the three remaining transmitting units each have stored position data relating to desired positions of the arrangement of transmitting units;
   wherein the first transmitting unit is configured to obtain the stored position data relating to the desired positions from the three remaining transmitting units;
   wherein the first transmitting unit is configured to assign the relative position data determined by the first transmitting unit to the obtained position data relating to a single desired position in order to determine the position of the first transmitting unit within the arrangement of transmitting units on the basis of the assignment.

2. The system according to claim 1, wherein the first transmitting unit is configured to capture a discrepancy between the determined relative position data relating to the first transmitting unit and the assigned desired position and to calibrate a transmission parameter of the first transmitting unit on the basis of the captured discrepancy.

3. The system according to claim 2, wherein the calibration of the first transmitting unit comprises setting a time parameter and/or a frequency parameter of the first transmitting unit.

4. The system according to claim 1, wherein the transmission signal and/or the first response signals is/are radio-frequency-based signals.

5. The system according to claim 1, wherein the first response signals have the position data relating to the desired positions of the arrangement of transmitting units.

6. The system according to claim 1, wherein the first response signals have data relating to a geometric boundary condition for an arrangement of the individual transmitting units within the arrangement of transmitting units.

7. The system according to claim 6, wherein the first transmitting unit is configured to assign the relative position data determined by the first transmitting unit to the obtained position data relating to a single desired position using the data relating to the geometric boundary condition in order to determine the position of the first transmitting unit within the arrangement of transmitting units on the basis of the assignment.

8. The system according to claim 7, wherein the geometric boundary condition specifies the arrangement of the at least four transmitting units in a plane.

9. The system according to claim 6, wherein the geometric boundary condition specifies the arrangement of the at least four transmitting units in a plane.

10. The system according to claim 1, wherein each transmitting unit in the arrangement of at least four transmitting units is configured to receive a radar signal from an object moving relative to the arrangement and to consequently emit a response signal to the moving object, with the result that a relative position of the moving object with respect to the arrangement of at least four transmitting units can be determined.

11. The system according to claim 1, wherein the arrangement has a total of eight transmitting units, at least six transmitting units of which are arranged substantially in one plane.

12. The system according to claim 11, wherein two transmitting units of the total of eight transmitting units are arranged at a distance from the plane.

13. A watercraft having a system according to claim 1.

14. The watercraft according to claim 13, wherein the arrangement of at least four transmitting units bounds a landing area for an aircraft.

15. A method for determining the position of a transmitting unit, comprising:
   arranging at least four transmitting units in an installation environment;
   emitting a first transmission signal from a first transmitting unit to each of the three remaining transmitting units;
   receiving the emitted first transmission signal by each of the three remaining transmitting units and returning a first response signal to the first transmitting unit by each of the three remaining transmitting units;
   determining relative position data relating to the first transmitting unit with respect to the three remaining transmitting units on the basis of the returned first response signals;
   storing position data relating to desired positions of the arrangement of transmitting units by the three remaining transmitting units;
   obtaining the stored position data relating to the desired positions from the three remaining transmitting units;
   assigning the relative position data determined by the first transmitting unit to the obtained position data relating to a single desired position in order to determine the position of the first transmitting unit within the arrangement of transmitting units on the basis of the assignment.

* * * * *